Figure 1:
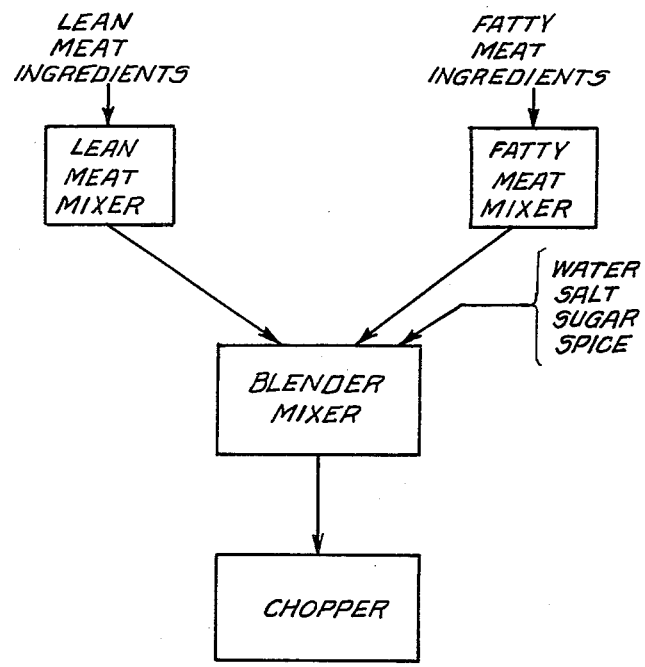

Aug. 21, 1962 E. W. KIELSMEIER ETAL 3,050,399
PREPARATION AND COMPOSITION CONTROL OF SAUSAGE MATERIALS
Filed Jan. 11, 1960 2 Sheets-Sheet 1

INVENTORS
Elwood W. Kielsmeier,
BY William B. Gara,
Cromwell, Greist & Warden

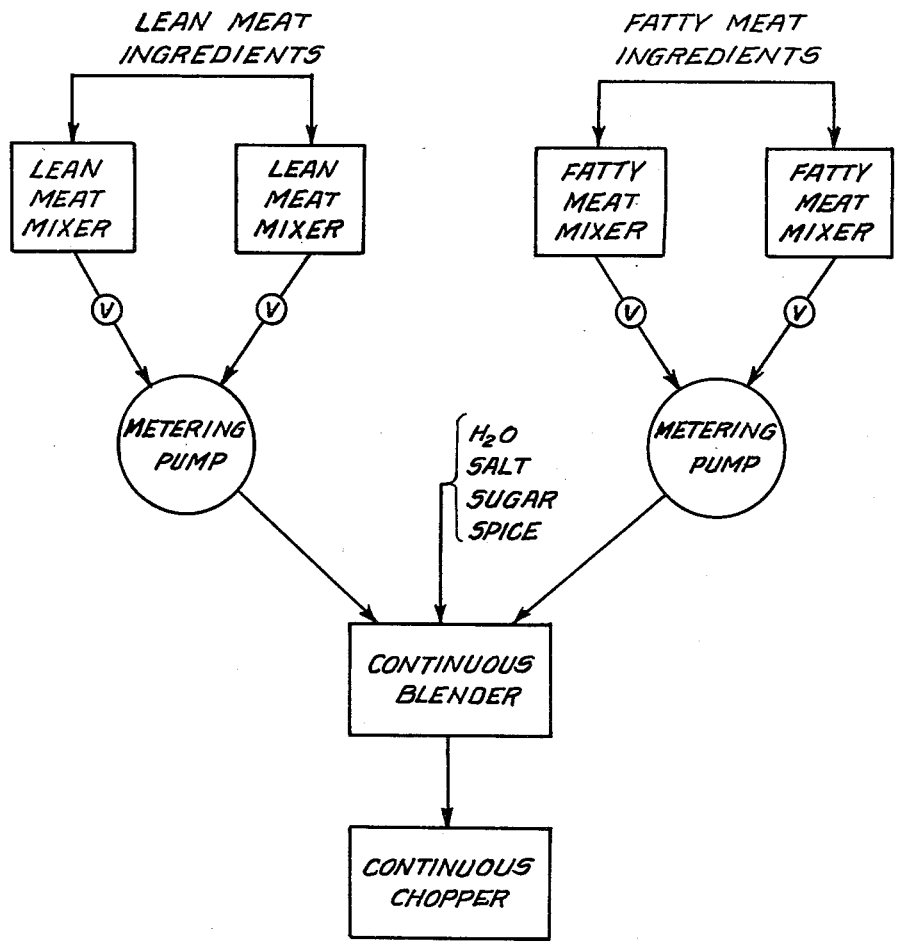

3,050,399
PREPARATION AND COMPOSITION CONTROL OF SAUSAGE MATERIALS
Elwood W. Kielsmeier and William B. Gara, Madison, Wis., assignors to Oscar Mayer & Co., Inc., Chicago, Ill., a corporation of Illinois
Filed Jan. 11, 1960, Ser. No. 1,569
7 Claims. (Cl. 99—109)

This invention relates to improvements and innovations in the preparation of ground meat products, especially sausage batter emulsions of sausage products made therefrom, whereby the same will have predetermined moisture, fat and protein contents within much narrower ranges than are now obtained in commercial production.

Since sausage batter emulsions can be prepared according to the present invention having predetermined moisture, fat and protein contents within a high degree of accuracy, sausage products may be produced therefrom having substantially greater uniformity than has heretofore been obtainable. While a number of improvements have been made in the production of various types of sausages and sausage meat type products, in one respect there has been little or no advance in the art, and much room for improvement has remained. This is in connection with the control of the sausage compositions with respect to content of moisture, fat and protein.

Taking the preparation of wiener batter by way of example, heretofore it has been the practice to follow recipe type of instructions for formulating relatively small batches (e.g. 500–700 lbs.) of the emulsion. A typical recipe for sausage emulsion would be as follows:

| | Lbs. |
|---|---|
| 50% lean pork trimmings | 200 |
| 80% lean pork trimmings | 100 |
| 75% lean beef trimmings | 75 |
| Regular cow meat | 125 |
| Water | 160 |
| Salt, sugar, spices, etc. | 40 |
| Total batch weight | 700 |

It will be noted that in the above formulation certain proportions of lean meat (i.e. beef trimmings) and fatty meat (pork trimmings) are called for. No matter how carefully these and the other ingredients are weighed out and then blended, the final emulsion will vary significantly from batch to batch with respect to moisture, fat and protein contents. For example, with normal skill and care being used in preparation, wieners produced by conventional methods usually have the following ranges of moisture, fat and protein contents: moisture, 49.0–56.0% (spread 7.0); fat, 29.0–35.0% (spread 6.0); and, protein, 9.0–12.0% (spread 3.0).

The reason control of moisture, fat and protein has been difficult is due to the fact that it is not possible to obtain a high degree of uniformity with respect to moisture, fat and protein contents in the lean and fatty meat ingredients in the various formulations. In other words, there is bound to be appreciable, and sometimes considerable, variation from one lot of beef trim to another, or from one lot of pork trim to another. There is considerable variation in the animals themselves and the trimming operation introduces variations. Heretofore by employing considerable skill, sausage makers have been able to produce sausage batter emulsions and sausage products wherein the moisture, fat and protein contents vary only in the order of the figures set forth above. Otherwise, the range of variation would have been even greater.

It has long been obvious that a number of valuable advantages would accrue from a practical method or procedure whereby the moisture, fat and protein contents of sausage batter emulsions could be controlled within much narrower ranges than is presently practical. For example, the finished product would be much more uniform and the increased uniformity of product and package would have an obvious appeal from the customer's viewpoint. From the sausage manufacturer's standpoint, there would be increased consistency with respect to product density, shrinkage, package weight and size, each of these having considerable practical value.

In accordance with the present invention, it has been found that by taking advantage of certain inherent and relatively fixed relationships in meat composition, sausage batter emulsions can be prepared having greatly improved uniformity with respect to moisture, fat and protein contents. This, of course, permits sausage products to be produced from such emulsions which likewise have greatly improved uniformity with respect to these contents and as a result thereof improvements in other properties and characteristics. While there may be considerable variation between one piece of meat and another (e.g. between a piece of pork trim and a piece of beef trim) with respect to the moisture, fat and protein contents thereof, nevertheless, there is a relatively fixed ratio between the meat moisture and protein contents. This stems from the fact that most of the moisture and protein of whole meat are found in the muscle, and muscle has a fairly constant composition. Thus, muscle contains between about 3.4 to 3.8 times as much water or moisture as it does protein. However, as an average factor 3.6 may be used since it will be sufficiently accurate in most instances and can be adjusted if necessary. If greater accuracy is required then any two of the three values (moisture, fat and protein) may be determined experimentally and the third calculated.

Therefore, if a piece of meat is chopped and mixed until it becomes a homogeneous mass, and if the moisture content is determined, from this the protein content can be ascertained using the constant 3.6, and the balance is fat. These relationships form a foundation for controlling the composition of sausage emulsions within a much greater degree of accuracy than is now obtained employing conventional techniques.

Accordingly, the object of the present invention, generally stated, is the provision of a practical method having several specific variations, whereby the composition of sausage batter emulsions and sausage products may be controlled within much narrower ranges with respect to moisture, fat and protein content than has heretofore been possible.

A further object of the invention is to take advantage of certain inherent basic relationships between the moisture, protein and fat contents of meat whereby sausage batter emulsions, and sausage and other ground meat products, can be produced with much greater flexibility on the one hand, and with much higher degree of control on the other hand, than has heretofore been possible with conventional techniques used in formulating and producing sausage emulsions.

A further object of the invention is the provision of a method of accurately controlling the moisture, protein and fat contents of sausage batter emulsions which may be applied either in the presence of only the meat ingredients or in the presence of some or all of the meat ingredients and also some or all of the added water, salt, sugar, spices and/or other ingredients.

A further object of the invention is the provision of a method of control whereby metered streams of lean meat and fatty meat may be continuously blended to form a composite stream having predetermined composition with respect to meat moisture, fat and protein content.

Certain other objects of the invention will, in part, be obvious and will in part appear hereinafter.

For a more complete understanding of the nature and scope of this invention, reference may now be had to the following detailed description thereof taken in connection with the accompanying flow diagrams which will be referred to in connection with the working examples hereinafter set forth.

EXAMPLE I

It is desired to prepare a 2000 pound batch of sausage emulsion containing 55% moisture, 12% protein, and 27% fat with the balance of 6% being salt, sugar and spices. The ingredients are to be beef trim, pork trim, added water, salt, sugar, spice, etc. Representative samples of the beef trim and pork trim are assayed for moisture content by one of several known rapid moisture determination techniques (e.g. Distillation Method, American Meat Institute Foundation, Bulletin #26, November 1955). It is found that the beef trim contains 62.9% moisture while the pork trim contains 40.8% moisture. Dividing each of these values by 3.6 it is determined that the beef trim contains 17.5% protein while the pork trim contains 11.6%. The balance in each case will be fat—i.e. 19.6% fat in the beef trim and 47.6% fat in the pork trim. On this basis of this information, it can be readily calculated by using simultaneous equations that the formulation for this batch of sausage emulsion using these ingredients should be:

|  | Lbs. |
|---|---|
| Beef trim | 850 |
| Pork trim | 786 |
| Water | 244 |
| Salt, sugar, spice, etc. | 120 |
|  | 2000 |

The calculations are summarized in the following table:

Table I

|  | Moisture, lbs. | Protein, lbs. | Fat, lbs. | Salt, Etc., lbs. | Total, lbs. |
|---|---|---|---|---|---|
| Beef | 535 | 149 | 166 |  | 850 |
| Pork | 321 | 91 | 374 |  | 786 |
| Water | 244 |  |  |  | 244 |
| Salt, sugar, spice |  |  |  | 120 | 120 |
| Total | 1,100 | 240 | 540 | 120 | 2,000 |
| Percent | 55 | 12 | 27 | 6 | 100.0 |

Experience has shown that the total moisture, fat and protein contents of sausage emulsion prepared according to the procedure of the foregoing example may be controlled within the limits indicated in the following table wherein the limits obtained using unctrolled (i.e. conventional) procedures are given for comparison.

Table II

|  | Percent Moisture | Percent Fat | Percent Protein |
|---|---|---|---|
| Controlled | ±1.2 | ±1.0 | ±0.25 |
| Uncontrolled (i.e. Conventional) | ±3.5 | ±3.0 | ±1.5 |

EXAMPLE II

Instead of blending separate batches of lean meat and fatty meat to give the desired final composition as in Example I, all of the ingredients estimated from experience are introduced and blended at the outset. A sample of the initial mixture is analyzed for moisture by a suitably rapid and accurate method. From this moisture analysis the composition of the initial mixture is calculated. This calculation is possible because of the relationship between the water, protein and fat contents of normal meats as above mentioned. When the initial composition has been determined, the necessary correction is made.

The following is an example of this method: 1830 pounds of a mixture of beef and pork trim were mixed with 398 pounds of water and 154.4 pounds of salt, spices, etc. to produce a total mixture weight of 2382.4 pounds. The mixture was shown to contain 56.5% moisture.

The following calculations were performed to determine the composition of the mixture. The mix weight (2382.4 pounds) was multiplied by 0.565 to give a total moisture weight of 1346 pounds. The total amount of water contained in the meat was determined by subtracting the added water (398 pounds) from the total moisture (1346 pounds) to give 948 pounds. In turn, the total amount of protein in the mixture was shown to be 263.2 pounds. This was determined by dividing the weight of water in the meat (948 pounds) by 3.6. The factor 3.6 relates the protein content to the moisture content as mentioned. The amount of ash contained in the meat was shown to be 13.2 pounds. This was determined by multiplying the water in the meat (948 pounds) by 0.014. The factor 0.014 is the result of determinations which show that there is ash present in meat to the extent of about 1.4% of the moisture. The amount of fat in the mixture was shown to be 605.6 pounds. This was obtained by subtracting the water in the meat plus the protein, plus the ash from the total weight of the meat

[1830 pounds−(948 pounds
+263.2 pounds+13.2 pounds)]=605.6 pounds

The the fat-to-protein ratio desired in the finished product was determined and shown to be 3.121. This was obtained by dividing the desired fat content (28.4%) by the desired protein content (9.1%). The total amount of fat required was calculated to be 821.6 pounds. This was determined by multiplying the amount of protein present (263.2) by the fat-to-protein ratio (3.121). The desired amount of fat needed to produce the correct fat-to-protein ratio was shown to be 216 pounds and this was determined by subtracting the amount of fat already present (605.6 pounds) from the total amount desired (821.6 pounds).

At this point in the calculation it is necessary to determine how much of the correcting material must be added to the original mixture to produce a final mixture having the desired composition. A supply of pork trim containing 31.8% moisture, 8.4% protein and 59.4% fat was available for making the necessary correction in the composition of this mixture. Since addition of fat in the form of pork trim results in the addition of some protein, it is necessary to compensate for this protein by the addition of slightly more fat than is indicated. This can be done in the following manner: the decimal fraction of protein in the pork trim times the desired fat-to-protein ratio is subtracted from the decimal fraction of fat in the pork trim to produce a factor. In this example the factor becomes 0.594−(0.084×3.121)=0.3318. Then the amount of fat needed (i.e. 216 pounds) is divided by this factor to indicate a required addition of 650.8 pounds. If on the other hand it was found that the mixture is low on protein a different factor is used. To obtain the proper factor, the decimal fraction of fat in the lean beef times the desired protein-to-fat ratio is subtracted from the decimal fraction of protein in the beef. The amount of protein in pounds needed is divided by this factor to find the pounds of beef required.

The next step is the determination of the total amount of protein which will now be present

[263.2+(650.8×0.084)]=318 pounds

The final batch weight is then determined by dividing the total amount of protein present (318 pounds) by the protein content desired (0.091) and becomes 3494.4 pounds. The amount of water needed is determined by subtracting the initial mixture weight plus the weight of pork trim added (2382.4 pounds+650.8 pounds) from the total indicated batch weight (3494.4). The desired water addition then is 461.2 pounds. Additional salt, spices, etc. would be added without materially affecting the overall composition.

This calculation can be checked as shown in Table B.

*Table B*

|  | Moisture, lbs. | Protein, lbs. | Fat, lbs. | Other, lbs. | Total, lbs. |
|---|---|---|---|---|---|
| Mixture | 1,346 | 263.2 | 605.6 | 167.6 | 2,382.4 |
| Pork Trim | 206.8 | 54.8 | 386.4 | 2.8 | 650.8 |
| Water | 461.2 | | | | 461.2 |
| Totals | 2,014.0 | 318.0 | 992.0 | 170.4 | 3,494.4 |
| Percent | 57.5 | 9.1 | 28.4 | ¹5.0 | 100.0 |

¹ Includes salt, sugar, spices, etc.

Analysis by official AOAC methods showed that the mixture contained 57.7% moisture, 8.9% protein and 28.5% fat.

After the initial mixture has been adjusted to give the desired final composition, the material can be conveyed continuously through an appropriate system to the chopping mechanism.

It will be noted that compensation for ash was made in Example II but not in Example I. Somewhat greater accuracy is obtained when ash is compensated for but it is not necessary in the sense of being essential to obtaining good results.

In the drawings the three figures are flow diagrams illustrating different embodiments of the invention. Thus, FIG. 1 corresponds to Example I. It indicates that lean meat ingredients are loaded into one mixer while fatty meat ingredients are loaded into a second. Any suitable type of mixer or mixer blender may be used provided it is large enough and designed or equipped to mix and blend a product such as ground meat. For example, a known commercial blender equipped with an agitator of the so-called center discharge cut-out type, serves very satisfactorily. After the lean meat ingredients and the fatty meat ingredients have been separately mixed and blended in the respective mixers so as to constitute homogeneous masses, the contents are assayed for one constituent, e.g. moisture, and then suitable calculations are made to determine the quantities of the respective masses which are required to yield the predetermined batter emulsion. Such quantities are then discharged from the two mixers into the blender mixer and the proper amounts of water, salt, spice, etc. are introduced. After the ingredients are uniformly blended into a homogeneous mass, the contents are then transferred to the chopper or other piece of apparatus depending upon the particular installation.

Figure 2:
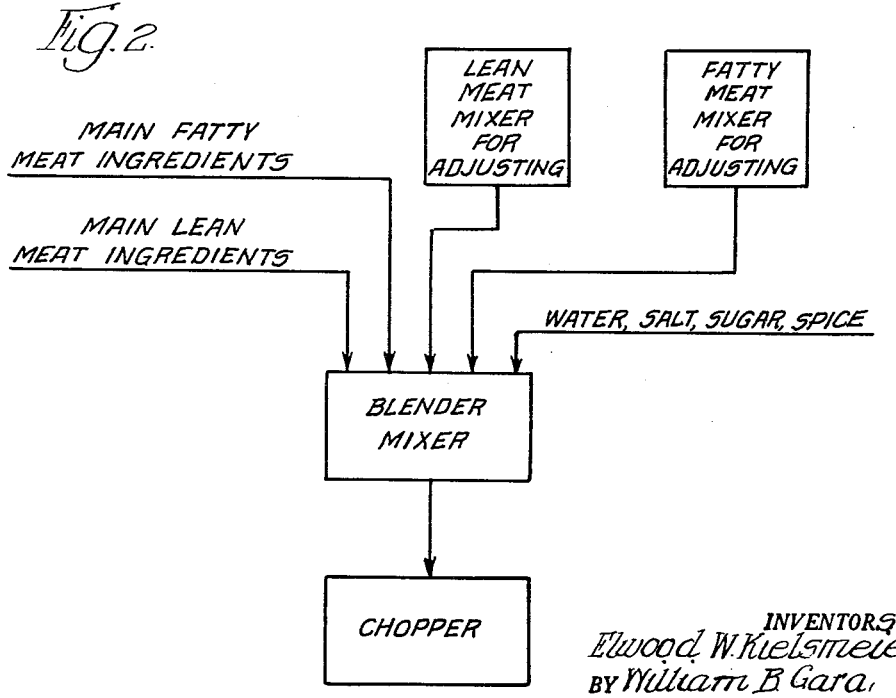

Referring to FIG. 2, in this flow diagram both the main quantities of lean and fatty meat ingredients are introduced into a mixer blender in approximately the quantities that are known to yield the desired sausage batter emulsion, as described in connection with Example II. After these main ingredients have been blended and mixed into a homogeneous mass appropriate samples are taken and at least one of the constituents, e.g. moisture, is rapidly determined. In separate blender mixers which may be relatively small compared to the main mixer blender, homogeneous masses of lean meat and fatty meat may be maintained. Depending upon whether the initial mix in the main blender mixer is lacking in protein or in fat, the proper addition of lean meat or fatty meat is made. The correct quantities of water, or ice, salt, spices, etc. are also added and the full batch is further mixed and blended until it becomes homogeneous and then it is transferred to the chopper or the next piece of apparatus.

In FIG. 3, a continuous, or semi-continuous, process is indicated in the flow diagram. In this instance there is at least one pair of lean meat mixers and at least one other pair of fatty meat mixers. First one of these mixers of each pair is emptied and then the other. After a batch of lean meat, for example, is prepared in one of the mixers, it is sampled and assayed for one of the constituents, e.g. moisture, protein or fat, and similarly for the other lean meat mixer and the two fatty meat mixers. Therefore, a predetermination can be made in accordance with Example I above of the proportions in which the lean meat mass and fatty meat mass are withdrawn from the respective mixers that supply the two metering pumps. The metering pumps are adjusted to discharge continuous streams of lean meat and fatty meat in the correct proportions to give the desired formulation. In like manner, water or ice, salt and spice may be similarly continuously added through a smaller proportioning device. From the continuous blender a uniform stream of the sausage batter emulsion is introduced into a continuous chopper or other desired piece of equipment. After one pair of lean and fatty meat mixers have been emptied a switch may be made to the second pair and then the first pair refilled.

After the salt has been added in any of the procedures represented in FIGS. 1–3, a blending time of at least about 15 minutes, and preferably 20 minutes, is allowed during which the salt solubilizes the myosin of the protein and the surfaces of the fat particles become coated with and encased in a film of the resulting extract. Preferably, the invention is applied to batches of sausage batter emulsion weighing at least 2000 pounds or more in contrast with the conventional sized batches of 500–700 pounds.

The foregoing procedures may be applied to comminuted meat products generally although it probably has greatest application to controlled preparation of sausage emulsions as for wieners, bologna, smoky links, etc.

Having explained the principles of the invention and illustrated the same with working examples, it will be readily appreciated wherein certain changes and variations can be made in applying the invention in the controlled preparation of ground meat products.

We claim:

1. In the method of preparing sausage emulsion of predetermined moisture, fat and protein contents the steps which comprise, preparing a plurality of separate homogeneous masses of comminuted meat at least one being on the lean side and at least one being on the fatty side, determining the moisture, fat and protein contents of each mass by assaying for at least one of these constituents, and blending meat from said masses in proportions to yield a blend having said predetermined content of moisture, fat and protein.

2. In the method of preparing sausage emulsion of predetermined moisture, fat and protein contents the steps which comprise, preparing a plurality of separate homogeneous masses of comminuted meat at least one being on the lean side and at least one being on the fatty side, determining the moisture, fat and protein contents of each mass by assaying for at least one of these constituents, determining the quantities of said homogeneous masses necessary to yield at least about 2000 pounds of said emulsion, and blending said quantities in the presence of the salt content for the emulsion for at least about 15 minutes.

3. The method of claim 2 wherein the moisture content of each homogeneous mass is determined and the protein and fat contents are determined therefrom.

4. In the method of preparing sausage emulsion of predetermined moisture, fat and protein contents the steps which comprise, preparing a plurality of separate homogeneous masses of comminuted meat at least one being on the lean side and at least one being on the fatty side, determining the moisture, fat and protein contents of each mass by assaying for at least one of these constituents, determining the proportions of said masses to yield a blend having said predetermined moisture, fat and protein contents, and continuously blending said masses in said proportions.

5. In the method of preparing sausage emulsion of predetermined moisture, fat and protein contents the steps which comprise, preparing a homogeneous pre-mix containing approximately the correct quantities of fatty and lean meats to give said predetermined contents, determining the moisture, fat and protein contents of said pre-mix by assaying for at least one of these constituents, and blending with said pre-mix sufficient lean or fatty meat of known moisture, fat and protein content to adjust the pre-mix to the correct composition with respect to moisture, fat and protein contents.

6. In the method of preparing sausage emulsion of predetermined moisture, fat, protein and salt contents the steps comprising, preparing at least about 2000 pounds of a homogeneous pre-mix containing approximately the correct quantities of fatty and lean meats to give said predetermined contents, determining the moisture, fat and protein contents of said pre-mix by assaying for at least one of these constituents in the meat ingredients, and blending with said pre-mix sufficient meat of known moisture, fat and protein content to adjust the pre-mix to the correct composition with respect to moisture, fat and protein contents, said blending extending for at least 15 minutes after the salt has been added.

7. In the method of preparing sausage emulsion of predetermined composition including predetermined moisture, fat and protein contents the steps which comprise, preparing a homogeneous pre-mix containing approximately the correct quantities of meat ingredients, water, salt and spices, determining the moisture, fat and protein contents of said pre-mix by assaying for at least one of these constituents in the meat ingredients, and blending with said pre-mix sufficient lean or fatty meat of known moisture, fat and protein content and additional quantities of water, salt and spices to adjust the pre-mix to correct final composition.

References Cited in the file of this patent
UNITED STATES PATENTS

| | | |
|---|---|---|
| 2,203,318 | Yerk | June 4, 1940 |
| 2,816,035 | Glabe | Dec. 10, 1957 |
| 2,874,060 | Turner et al. | Feb. 17, 1959 |
| 2,952,552 | Ansel | Sept. 13, 1960 |

UNITED STATES PATENT OFFICE
CERTIFICATE OF CORRECTION

Patent No. 3,050,399                                        August 21, 1962

Elwood W. Kielsmeier et al.

It is hereby certified that error appears in the above numbered patent requiring correction and that the said Letters Patent should read as corrected below.

Column 1, line 12, for "of" read -- and --; column 3, line 53, for "unctrolled" read -- uncontrolled --; column 4, line 30, for "The" read -- Then --; column 5, line 53, for "filow" read -- flow --.

Signed and sealed this 15th day of January 1963.

SEAL)
.ttest:

:RNEST W. SWIDER                                        DAVID L. LADD
.ttesting Officer                                           Commissioner of Patents